United States Patent [19]

Skoupi et al.

[11] 4,397,407
[45] Aug. 9, 1983

[54] APPARATUS FOR THE PRODUCTION OF A SOLID-FORMING OR FOAM-FORMING MIXTURE COMPOSED OF AT LEAST TWO FLOWABLE REACTION COMPONENTS AND FILLERS

[75] Inventors: Dieter Skoupi, Linde; Gerd Weber, Leichlingen, both of Fed. Rep. of Germany

[73] Assignee: Bayer Aktiengesellschaft, Leverkusen, Fed. Rep. of Germany

[21] Appl. No.: 245,816

[22] Filed: Mar. 20, 1981

[30] Foreign Application Priority Data

Apr. 3, 1980 [DE] Fed. Rep. of Germany ....... 3013237

[51] Int. Cl.³ .............................................. B67D 5/60
[52] U.S. Cl. .................................... 222/132; 222/145; 239/400
[58] Field of Search .............. 222/129, 132, 135, 145, 222/148, 149, 504; 239/116, 117, 118, 400

[56] References Cited

U.S. PATENT DOCUMENTS

| | | | |
|---|---|---|---|
| 2,233,304 | 2/1941 | Bleakley | 239/400 |
| 3,975,128 | 8/1976 | Schlüter | 222/145 |
| 4,211,345 | 7/1980 | Taubenmann | 222/334 |

FOREIGN PATENT DOCUMENTS

| | | |
|---|---|---|
| 1729539 | 7/1971 | Fed. Rep. of Germany . |
| 7504212 | 5/1975 | Fed. Rep. of Germany . |
| 517581 | 2/1972 | Sweden . |

Primary Examiner—Joseph J. Rolla
Assistant Examiner—Charles C. Compton
Attorney, Agent, or Firm—Gene Harsh; Joseph C. Gil; Lyndanne M. Whalen

[57] ABSTRACT

An apparatus for producing a solid-forming or foam forming mixture. Feed pipes carry reaction components from storage containers to a mixhead where they merge into a mixing chamber. A separate feed pipe leads into the outlet of the mixing chamber for the introduction of a filler into the reaction mixture. The outlet of the mixing chamber is arranged partially in a tube which is coaxial with a housing. The tube is movable within the housing and acts as a closure for the filler feed pipe.

8 Claims, 3 Drawing Figures

APPARATUS FOR THE PRODUCTION OF A SOLID-FORMING OR FOAM-FORMING MIXTURE COMPOSED OF AT LEAST TWO FLOWABLE REACTION COMPONENTS AND FILLERS

BACKGROUND OF THE INVENTION

The invention relates to a method and an apparatus for the production of a solid-forming or foam-forming mixture composed of at least two flowable reaction components and filler. Two reaction components are injected into a mixing zone under high pressure. The components are mixed with each other and ejected from the mixing zone as a force-fed jet. Filler is added to the jet.

This method may be used in the manufacture of continuous profiles such as webs or foam blocks over prolonged periods during continuous passage through a mixing zone. The method may also be used as a batch process. Mixing takes place during the continuous passage through a mixing zone but the mixing process is interrupted after filling each mold.

The addition of fillers serves various purposes. Inexpensive fillers are added in order to reduce the material costs for articles which will be subjected to only slight stress. Fillers may also be added to achieve specific properties in the resultant products.

The fillers are usually present in finely powdered to granular form. Sometimes they are used in short-fiber form. They are optionally washed. The fillers are generally abrasive and cause marked wear in the feed pipes, the pumps and the injection nozzles.

Attempts have already been made to introduce the fillers directly into the mixhead and mix them with the reaction components. However, sealing problems occurred in this process. Feeding was found to be difficult in high pressure mixheads due to the high conveying pressures needed bacause the fillers clogged the feed pipe.

Therefore, it has also been proposed that the fillers be introduced into the finished reaction mixture by mixing it for a short time with the fillers in an intermediate container. This measure is only practicable with extremely slowly reacting reaction mixtures which makes it undesirable economically.

The object is to find a method enabling fillers to be introduced into a fast reacting reaction mixture. Moreover, it should be possible, if desired, to achieve a maximum filler content in the mixture or in the finished article. The apparatus which can be used should be substantially free from wear. Parts whose wear is unavoidable should be arranged in such a way that they are easily exchangeable. Moreover, sufficiently accurate metering of the fillers should be ensured.

DESCRIPTION OF THE INVENTION

Figure 1:
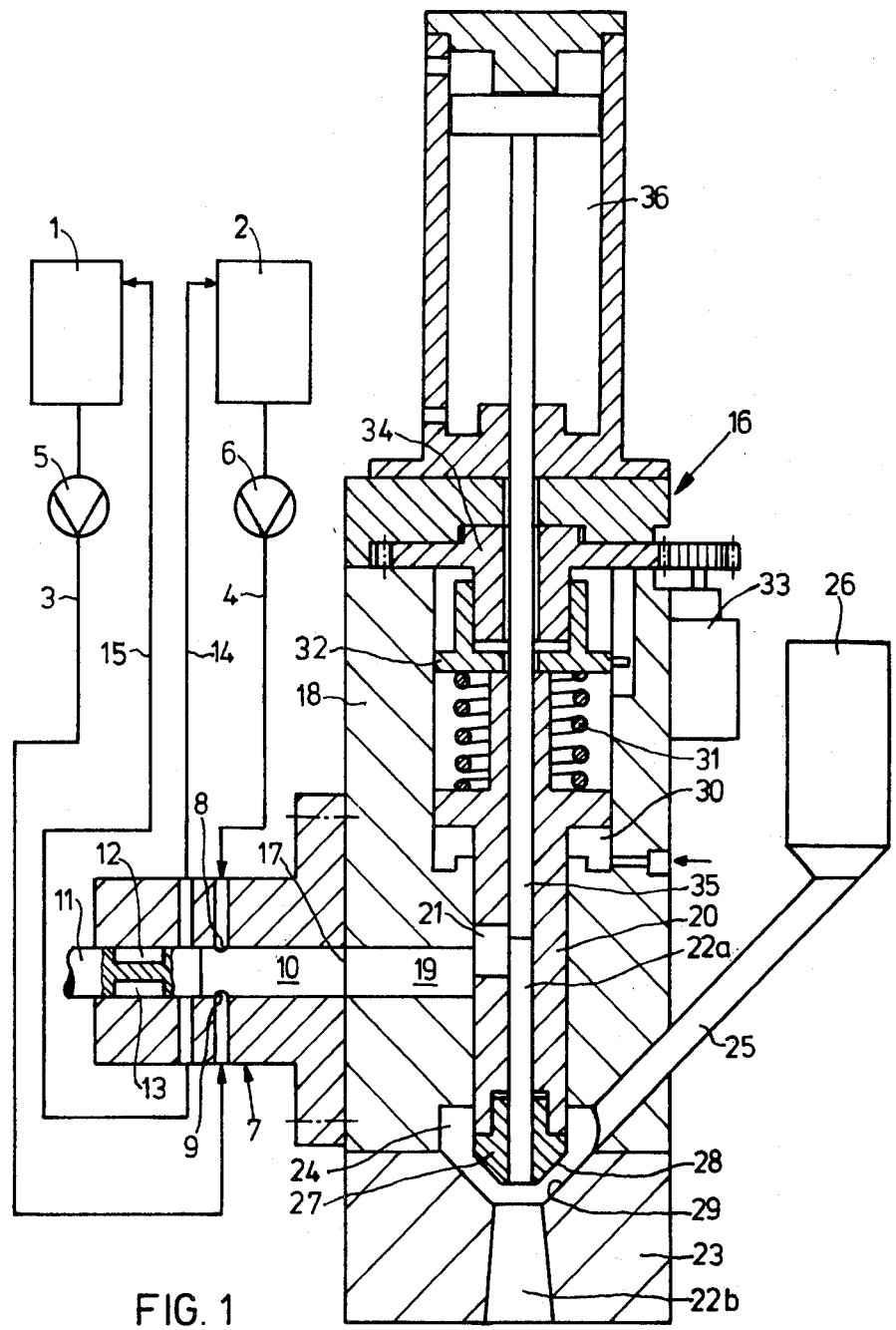
FIG. 1 shows a first embodiment of the apparatus with attachment.

The instant invention is directed to a method of producing a solid-forming or foam-forming mixture comprising at least two flowable reaction components and fillers, comprising the steps of:
- (a) injecting two reaction components into a mixing zone under high pressure;
- (b) mixing said components in said mixing zone;
- (c) ejecting said reaction mixture from the mixing zone as a force-fed jet; and
- (d) metering and supplying filler to the jet where it is sucked into the jet, entrained and mixed with the reaction mixture by swirling.

The advantage of this procedure is that the fillers are added to the previously mixed reaction mixture and not to the reaction components. The method is, therefore, also suitable for use in mixheads with recirculation of the components during the intervals. In fact, it is most advantageous to add the fillers to the reaction mixture as deposits do not, thus, form. The reaction mixture does not enter the filler supply line as the jet exerts a suction effect on the filler. It is not, therefore, necessary to supply the filler under pressure. The risk of bridge formation (clogging) is, thus, reduced, ensuring disturbance-free metering of the filler.

Suitable fillers include those based on silicates, sulfates, carbonates, dye pigments and fibers, in particular glass.

The method is carried out using an apparatus comprising:
- (a) storage containers for reaction components;
- (b) feed pipes which lead from the storage containers via metering pumps to a mixhead where the reaction components merge via injection openings into
- (d) a mixing chamber with an outlet passage;
- (e) a storage container for filler which leads to said outlet passage of said mixing chamber via a filler feed pipe.

It is immaterial whether the mixhead itself has a control piston which simultaneously has a cleaning function or is valve-controlled and the mixing chamber is cleaned by means of a cleaning plunger.

The novelty lies principally in the fact that the filler feed pipe merges into the outlet passage. This prevents the pumps, feed pipes and nozzles or optionally control channels from being exposed to any abrasive fillers. Only the outlet passage comes in contact with the fillers. However, it is usually arranged in a housing-like member capable of being exchanged easily as a whole and/or having additional exchangeable members composed of wear-resistant material at the endangered points.

According to a particular embodiment, the outlet passage is arranged in an attachment provided at an angle, preferably transversely to the mixing chamber outlet. This measure allows existing mixheads to be equipped by placing the attachment against the outlet opening of the mixing chamber.

A cleaning plunger is preferably mounted movably in the outlet passage. Mixheads of this type are known (U.S. Pat. No. 3,975,128).

The mouth of the filler feed pipe preferably surrounds the outlet passage concentrically. This permits more uniform and faster mixing of the filler with the reaction mixture. The wear per unit surface area is also reduced at the mouth as the quantity of filler to be supplied is distributed over a larger area.

According to a particularly advantageous embodiment, the filler feed pipe enters into the outlet passage at an angle corresponding at least to the angle of repose of the filler to be introduced. This measure reduces the risk of bridge formation (clogging) and helps the filler to slide into the feed pipe.

Alternative to the attachment embodiment, the mixing chamber may be arranged upstream of the outlet passage lying on the same axis. This design is also known without the addition of filler (U.S. Pat. Nos. 2,890,836 and 4,141,470).

In a preferred development of the apparatus, the outlet passage is arranged partially in a coaxial tube which is movable in the housing and pipe.

The mouth of the filler feed pipe can be opened and closed by moving this tube whose head can be placed against an opposing face. The apparatus can also be operated intermittently without the addition of filler, and the possibility arises of adding the filler in the ready produced reaction mixture only intermittently so as to form finished articles having zones containing filler and zones without filler.

The operating stroke of the filler feed tube is preferably adjustable. This measure allows the cross-section of flow of the filler feed pipe mouth to have a desired value. In this way, the quantity of filler to be supplied can be adjusted or altered independently of the suction of the reaction mixture jet even during the mixing process.

According to another variation, several filler feed pipes are arranged in succession. This has the advantage that various fillers can be supplied separately in succession, or the same filler can be introduced via several filler feed pipes in order to charge the reaction mixture more highly with filler.

The novel apparatus is illustrated purely schematically in several embodiments in the drawings and is described in more detail below.

In the apparatus according to FIG. 1, the reaction components, polyol and isocyanate which form polyurethane foam during their reaction pass from storage containers 1,2 via feed pipes 3,4 in which metering pumps 5,6 are arranged, to a mixhead 7 and enter via injection openings 8,9 into a mixing chamber 10. An ejection and control piston 11 is movably mounted in the mixing chamber. It has return grooves 12,13 by means of which the feed pipes 3,4 can be connected via circulatory pipes 14,15 to the storage containers 1,2. An attachment 16 is arranged on the mixhead 7 in such a way that the mixing chamber 10 is lengthened beyond its actual outlet opening 17 into the housing 18 of the attachment 16 in the form of a connecting channel 19. A movable tube 20 having a gap 21 corresponding to the cross-section of the mixing chamber 10 or that of the connecting channel 19 is guided in the housing 18 transversely of the axis of the mixing chamber 10. An outlet passage 22 is arranged partially (22a) in the tube 20 guided in the housing 18 and partially (22b) in a coaxial outlet member 23 sealing the housing 18. At the transition of the housing 18 to the outlet member 23, the tube 20 is surrounded by a concentric annular channel 24 into which merges a filler feed pipe 25 inclined at the angle of repose of a filler to be supplied. It leads from a storage container 26. The tube 20 has an exchangeable head 27 composed of high tensile steel. The head 27 has an oblique end face 28 cooperating with a correspondingly inclined sealing face 29 which forms the bottom of the annular channel 24 and is arranged in the outlet member 23. The gap 21 is arranged in such a way that it is in alignment with the connecting channel 19 when the tube 20 seals the filler feed pipe 25, i.e. when the head 27 rests on the sealing face 29. In this position, the control and ejection piston 11 can be pushed into the outlet passage 22a. The movability of the tube 20 is ensured by a hydraulic motor 30. It operates against a compression spring 31. The compression spring rests on an adjusting nut 32 which is guided in the housing 18 and cooperates with another adjusting nut 34 capable of being actuated from outside by means of an adjusting drive system 33. The adjusting nut 32 can thus be adjusted in an axial direction in order to set the desired stroke height of the tube 20. The adjusting nut 32 acts as a stop for the tube 20. Finally, an additional cleaning plunger 35 which can be actuated by a hydraulic motor 36 is guided in the outlet passage 22.

Figure 2:
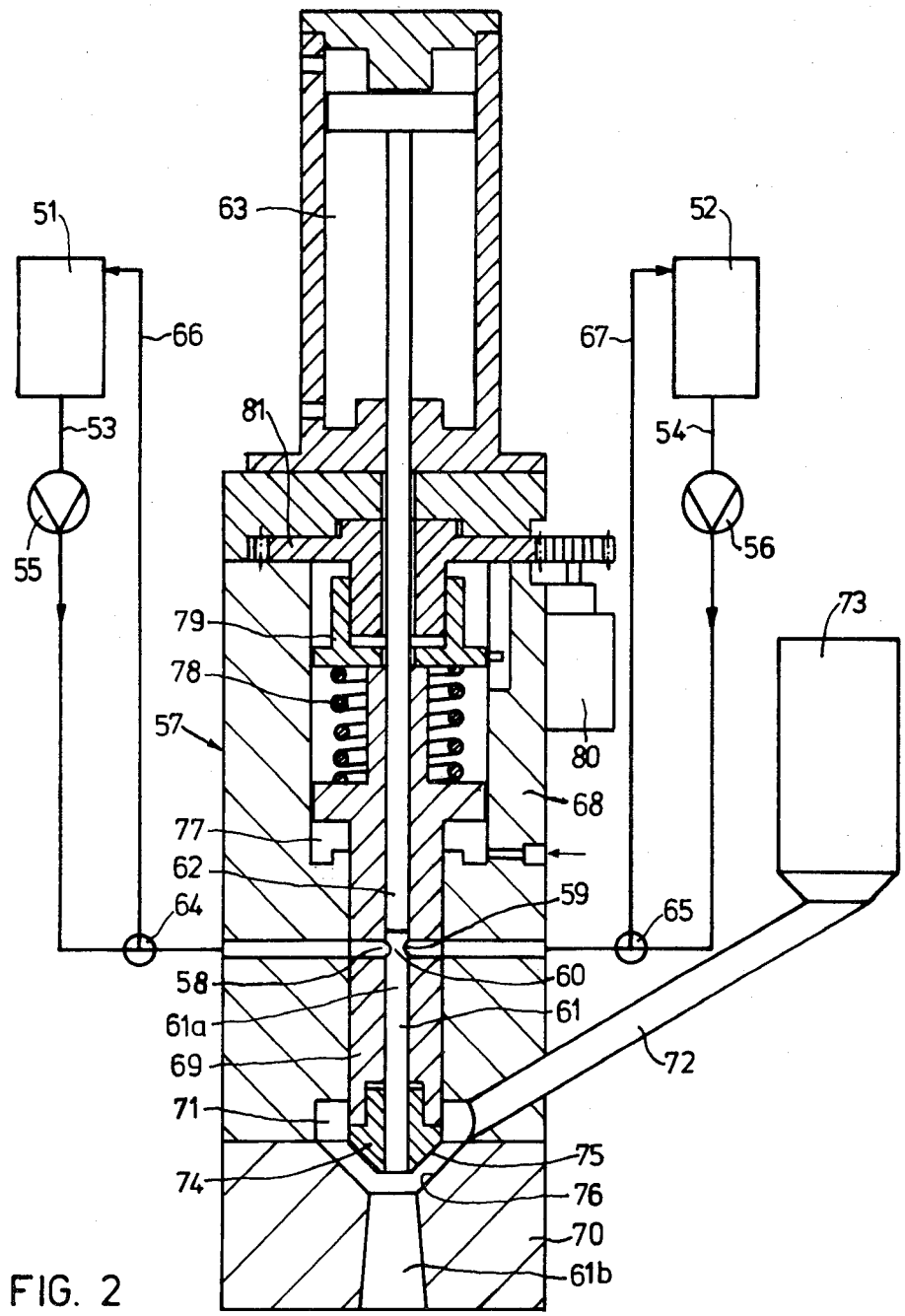
FIG. 2 shows a second, more compact embodiment.

In the apparatus according to FIG. 2, the reaction components, polyol and isocyanate which react to form a polyurethane foam, pass from the storage containers 51,52 via feed pipes 53,54 in which metering pumps 55,56 are arranged to a mixhead 57. They merge via injection openings 58,59 into a mixing chamber 60. The mixing chamber 60 represents an extension of an outlet passage 61. The mixing chamber 60 and outlet passage 61 merge into each other without a boundary. The mixing chamber 60 is limited at the back by a cleaning plunger 62 which can be moved through the mixing chamber 60 to the end of the outlet opening 61 by means of a hydraulic drive system 63. Circulatory pipes 66,67 entering into the storage container 51,52 branch from change-over valves 64,65 arranged in the feed pipes 53,54. The outlet passage 61 is arranged partially (61a) in a tube 69 guided in the housing 68 of the mixhead 57 and partially (61b) in a coaxial outlet member 70 sealing the housing 68. At the transition from the housing 68 to the outlet member 70, the tube 69 is surrounded by concentric annular channel 71 into which a filler feed pipe 72 leading from a storage container 73 merges at the angle of repose. Filler, for example barium sulfate, is supplied from the storage container 73. The tube 69 has an exchangeable head 74 composed of a highly wear-resistant polyurethane elastomer. The head 74 has an oblique end face 75 co-operating with a correspondingly inclined sealing face 76 forming the bottom of the annular channel 71 in the outlet member 70. The movability of the tube 69 is ensured by a hydraulic motor 77. It operates against a compression spring 78. The compression spring rests on an adjusting nut 79 which is guided in the housing 68 and co-operates with an additional adjusting nut 81 which can be actuated from outside by means of an adjusting drive system 80. The adjusting nut 79 can, thus, be adjusted in an axial direction in order to set the desired stroke width of the tube 69. The adjusting nut 79 acts as a stop for the tube 69.

Figure 3:
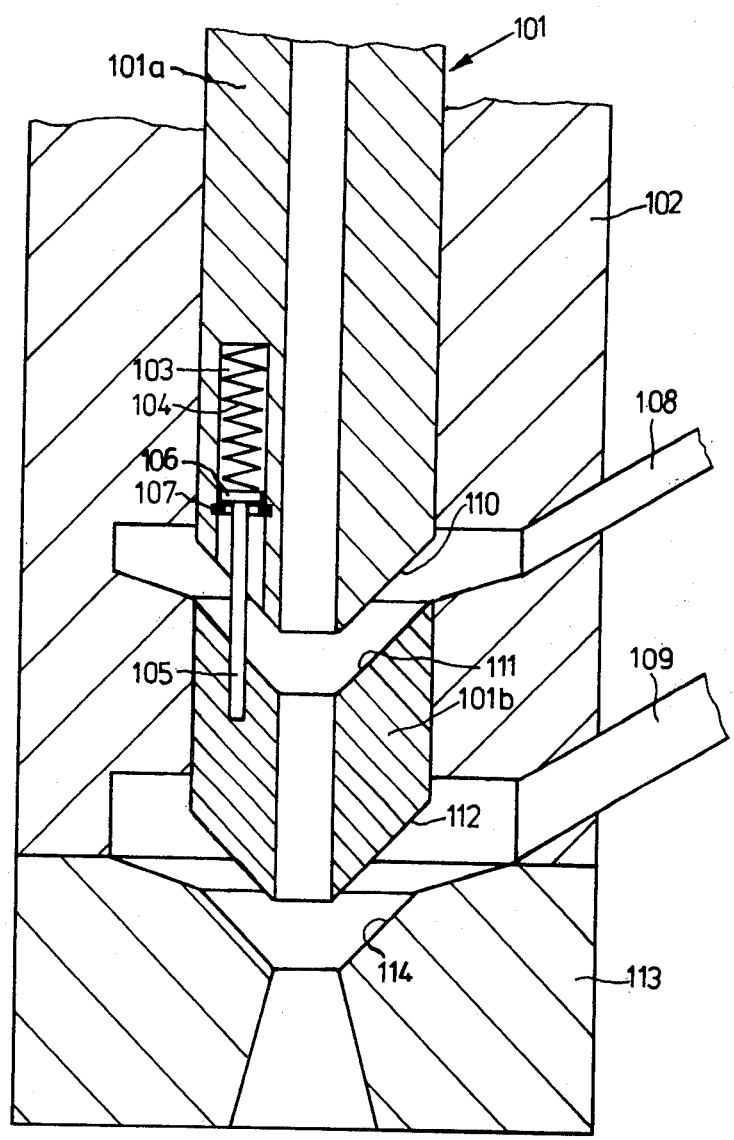
FIG. 3 shows an embodiment with several filler feed pipes connected in series.

In FIG. 3, the tube 101 is split up into portions 101a,101b. Both portions 101a,101b are guided in the housing 102. The design and mode of operation of the portion 101a corresponds to the tube 20 in FIG. 1. However, the portion 101a has an axially parallel recess 103 on its end face in which is arranged a compression spring 104. The compression spring 104 presses against a pin 105, which is adjustably fixed in the portion 101b and which has a head 106 penetrating into the recess 103. This head 106 strikes a Seeger circular clip ring 107 and prevents the pin 105 from sliding out. The portion 101b is, therefore, entrained by the opening movement of the portion 101a. FIG. 3 shows both filler feed pipes 108,109 in the open condition. In the closed condition, the end face 110 of the portion 101a lies against the rear end face 111 of the portion 101b whose front end face 112 lies on the sealing face 114 provided in the outlet member 113. During the opening stroke of the portion 101a, the portion 101b remains at rest until the head 106 of the pin 105 strikes the Seeger circular clip ring 107 and is entrained. The gap width between the portions 101a, 101b can be varied due to the adjustability of the length of the pin 105. The gap width between the end face 112 of the portion 101b and the sealing face 114 is determined by the stroke width of the tube 101 adjusted for the portion 101a minus the gap width between the portions 101a,101b.

EXAMPLE

An apparatus according to FIG. 2 is used. The mixing process is initiated by the retraction of the cleaning plunger 62 and the tube 69, during which the injection openings 58, 59 are cleared so that 12 l/min of polyol from the storage container 51 and 6 l/min of isocyanate from the storage container 52 can be injected into the mixing chamber 60. The reaction mixture produced by the countercurrent injection leaves the outlet passage 61a at a velocity of about 6 m/sec. In this way a subatmosphere pressure is produced by means of which 2.7 kg/min of glass fibre granules of a grain size of 1 mm are sucked in from the filler feed pipe 72 and are automatically mixed with the reaction mixture. The mixing process is terminated by causing the cleaning plunger 62 to close the injection openings 58,59 and clean the outlet passage 61a and by pressing the tube 69 against the sealing face 76 of the annular channel 71 with the oblique end face 75 of its head 74, thereby interrupting the connection between the filler feed pipe 72 and the outlet passage 61. The glass fibre reinforced foam product obtained from the reaction mixture and the glass fibre filler has a density of about 1200 kg/m$^3$. The content of glass fibre filler is 15 percent by weight.

What is claimed is:
1. An apparatus comprising:
 (a) storage containers for reaction components;
 (b) feed pipes which lead from the storage containers via metering pumps to a mixhead where the reaction components merge via injection openings into a mixing chamber;
 (c) an outlet passage connected to said mixing chamber, said outlet passage being arranged in a tube that is coaxially mounted in a housing, said tube being movable relative to said housing;
 and (d) a storage container for filler which leads to said outlet passage of said mixing chamber via a filler feed pipe with the coaxial tube being designed as a closure means for said filler feed pipe.
2. The apparatus of claim 1, wherein said outlet passage of said mixing chamber is an attachment to said mixing chamber.
3. The apparatus of claim 1, further comprising a movable cleaning plunger in said outlet passage.
4. The apparatus of claim 1, wherein the mouth of said filler feed pipe surrounds said outlet passage concentrically.
5. The apparatus of claim 1, wherein said filler feed pipe enters into said outlet passage at an angle corresponding at least to the angle of repose of the filler to be introduced.
6. The apparatus of claim 1, wherein said mixing chamber is arranged upstream of said outlet passage lying in the same axis.
7. The apparatus of claim 1, wherein the stroke width of said tube is adjustable.
8. The apparatus of claim 1, wherein several product feed pipes are arranged in series.

* * * * *